Figure 1:
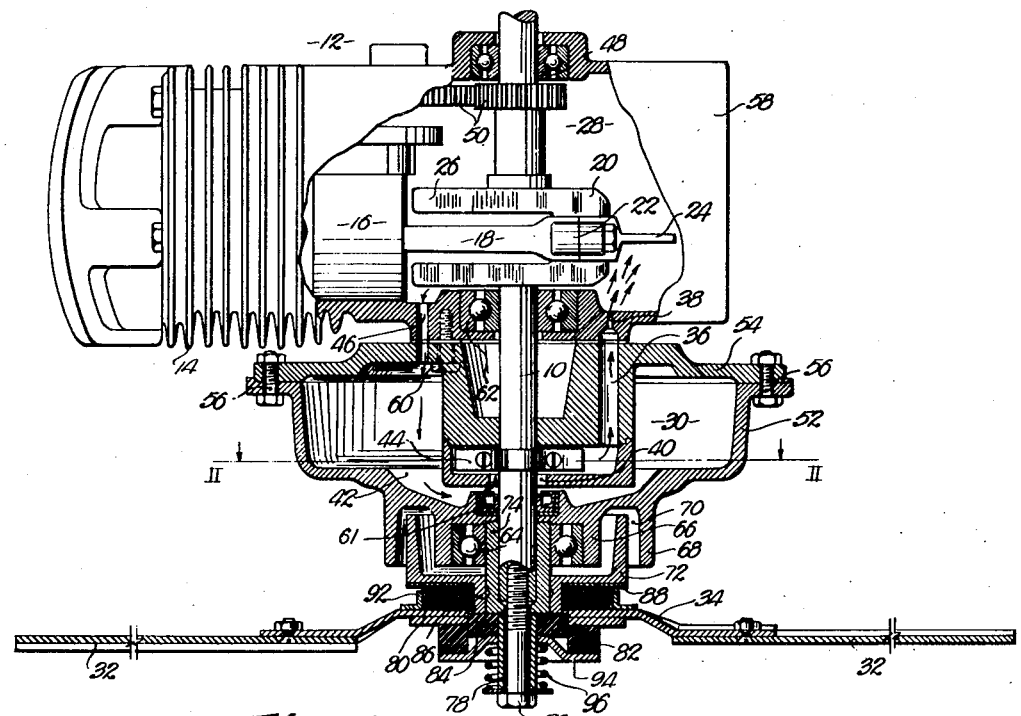

Jan. 30, 1951

L. B. GOODALL 2,539,619

ENGINE LUBRICATING SYSTEM

Filed Oct. 22, 1945

INVENTOR.
Leonard B. Goodall
BY
ATTORNEY.

Patented Jan. 30, 1951

2,539,619

UNITED STATES PATENT OFFICE 2,539,619

ENGINE LUBRICATING SYSTEM

Leonard B. Goodall, Warrensburg, Mo.

Application October 22, 1945, Serial No. 623,778

2 Claims. (Cl. 184—6)

This invention relates to power mowing machines of the character employing an internal combustion engine or the like for motivating the cutting blades of the machine and the primary object of the invention is to provide novel, unique and effective structure for mounting the engine so that its vertical crank shaft will be operably maintained in position, yet completely and adequately lubricated so far as the parts within the crank case of the engine are concerned.

One of the important aims of the invention is to provide a mounting for a vertical crank shaft engine which includes parts on the crank shaft for directing lubricating oil under pressure upwardly toward the connecting rod and bearing elements constituting the means for joining together the piston and drive shaft of the engine.

A still further aim of this invention is to provide means for mounting a vertical crank shaft engine in a position to drive a rotary cutter, the means including specially formed and disposed ducts through which oil is circulated from one chamber of the crank case to another through the medium of parts directly joined to the vertical crank shaft.

This invention has for an even further object the provision of means for mounting a vertical crank shaft engine on a grass cutter or mowing machine which engine is disposed in a fashion shown in my previous U. S. Letters Patent No. 2,208,972, dated July 23, 1940.

This invention has for further aims to provide a vertical crank shaft engine with rugged, effective and relatively inexpensive means for mounting the engine and maintaining the parts thereof fully lubricated; to provide a resilient joint between the grass cutting blades and the said vertical crank shaft of the engine which resilient joint permits tilting of the blade as it rotates and allows relief slippage in the event obstacles are encountered; and to provide grass cutting blades and a mounting therefor that are formed to establish an upward suction as the blades are rotated.

Other aims of the invention are important, will appear during the course of the following specification and be apparent to one skilled in the art when the form of the invention chosen for illustration is understood.

Figure 2:
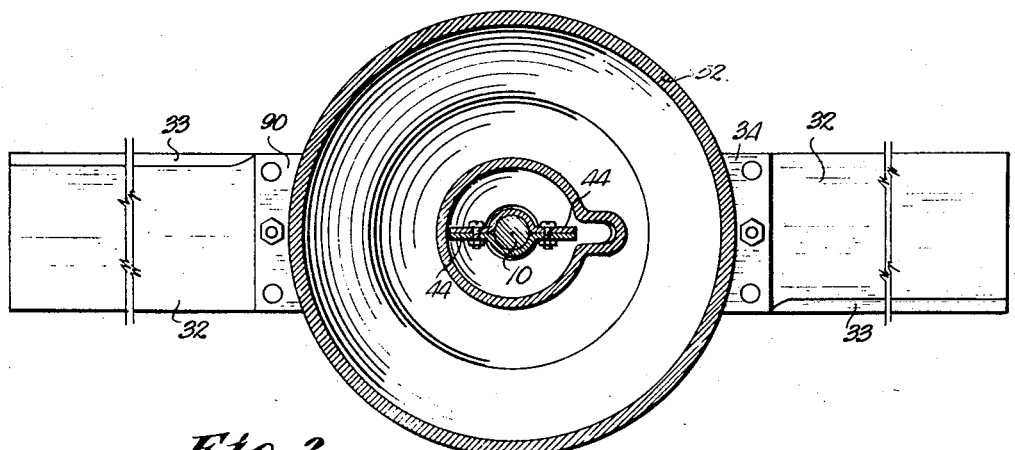

In the drawing:

Fig. 1 is a side elevational fragmentary view of the vertical crank shaft engine mounting and blade assembly for mowing machines made in accordance with the present invention and showing the lower portion of the assembly in central section, and Fig. 2 is a horizontal cross sectional view taken on line II—II of Fig. 1 and looking in the direction of the arrows.

The manner of mounting a prime mover for the cutting blades of a mowing machine with the crank shaft of the engine in a vertical position is made clear in my previous U. S. Letters Patent No. 2,208,972 and since the equipment forming a part of the mowing machine and which is associated with the engine and blade does not constitute a part of this invention, such is not disclosed nor will it be described. Suffice it to say that the assembly shown in Fig. 1 of the drawing herewith will rest upon the horizontal bed of the mowing machine or rotary grass cutter with the illustrated blades in a substantially horizontal plane adjacent to, and spaced above, the surface of the ground where grass cutting is to occur.

In practice the lower portion or section of the crank case is perched upon the bed of the mowing machine, all as is obvious from my above identified patent and the prior art.

The vertical crank shaft 10 forms a part of the prime mover or internal combustion engine broadly designated by the numeral 12 and of course, comprising a cylinder 14, a piston 16 and a connecting rod 18. The connecting rod is joined to crank shaft 10 at the offset portion 20 thereof through the medium of a conventional bearing 22 whereon a splash plate 24 is mounted. In the form of the engine shown, balance weights 26 on a portion of crank shaft 10 are disposed diametrically opposite to bearing 22.

The crank case of engine 12 is constructed to present dual chambers, one of which is designated by the numeral 28 while the other chamber is indicated at 30. Chamber 28 will hereinafter be called an "upper" chamber while chamber 30 will be generally designated as the "lower" chamber of the crank case. Connecting rod 18, bearing 22 and the offset portion 20 of crank shaft 10 are all disposed within upper chamber 28 while lower chamber 30 contains a depending section of crank shaft 10 that extends to a zone of juncture with cutting blades 32, carried by a bracket 34 joined to the lowermost end of crank shaft 10 through the medium of unique resilient mounting elements, all to be hereinafter described.

Upper and lower chambers 28 and 30 respectively, are placed into communication by at least two ducts for the purpose of establishing or permitting the establishment of oil circulation. Duct 36 is substantially L-shaped (as clearly shown in Fig. 1), terminates in a restricted length 38 at its point of juncture with the upper chamber and communicates with an opening 40 which, in turn receives oil from a sump 42 provided in the lowermost part of lower chamber 30.

A pair of blades 44 carried by crank shaft 10 within the base or horizontal portion of the substantially L-shaped duct 36 are arranged radially as illustrated in Fig. 2 and when the crank shaft is rotated about its axis these blades establish a pumping action to force oil from within sump 42 to upper chamber 28. The arrows of Fig. 1 clearly define the path of travel of the lubricating oil. At least another duct besides No. 36 establishes connection between upper chamber 28 and lower chamber 30. Duct 46 is a return passage for the oil and when the lubricating oil has been forced into upper chamber 28, it will return through the action of gravity by way of duct 46 and back into lower chamber 30. Thus a complete cyclic patent is established and constant motivating of the lubricating oil will insure that the parts within upper chamber 28 will be thoroughly bathed in a vapor of lubricant. This lubricating oil will cover the upper ball-bearing assembly 48 as well as timing gears 50. Lower chamber 30 is formed of a pan-shaped casting 52 having a cover 54 bolted in place by members 56. This cover 54 is bolted to the casting 58 within which chamber 28 is formed by machine screws 60. A packing 61 prevents oil from passing out of sump 42 and along crank shaft 10. Crank shaft 10 is further held in position by ball-bearing assemblies 62 and 64, the latter being confined within a cavity on the bottom of casting 52 by an annular depending flange 66. This flange 66 cooperates with a similar flange 68 in establishing an annular inverted groove 70 completely circumscribing ball-bearing assembly 64. Groove 70 received the annular side wall of a cup-shaped member 72 that carries bushing 74 pressed into driving engagement with the lower end of crank shaft 10 by machine screw 76 and collar 78. Screw 76 is threadingly engaged within a socket formed in the lower end of crank shaft 10 and when the parts are assembled as illustrated in Fig. 1, the ball-bearing assembly 64 is completely protected.

The structure for mounting blades 32 is unique in that there is no metal to metal contact between the blades and the driving parts assembled with crank shaft 10. A series of resilient elements are employed in the fashion shown and comprise an annulus 80, a ring 82 and a perforated spacer 84. The perforation of space 84 receives collar 78 and its upper face bears against the lower end of bushing 74 and the lower adjacent edge of member 72. Note that member 72 and bushing 74 are keyed together. Annulus 80 circumscribes the boss 86 on member 72 and underlies a portion of member 72. In other words, the upper surface of annulus 80 bears against a fiber washer or the like 88, while the lower surface of annulus 80 rests upon the upper surface of bracket 34 upon which is disposed a flange 92 to bear against the annular outer face of annulus 80. Ring 82 has its upper surface bearing against the underside of bracket 34 while the lower face of ring 82 is engaged by a cap 94 centrally dished, as clearly shown in Fig. 1, to receive one end of spring 96. The other end of spring 96 rests upon a washer 98 and as machine screw 76 is turned in one direction, spring 96 will be tensioned. This tension is transmitted to cap 94 and thence to spacer 84, ring 82 and (through bracket 34 to annulus 80). All of these last mentioned resilient elements are capable of yielding in the event force of unnatural character is exerted upon blades 32. A tipping action or tilting from the horizontal is made possible through the employment of such mounting structure and if either of the blades 32 should engage a rock or other relatively rigid obstruction, the engine may continue to drive crank shaft 10 while blades 32 remain stationary and bracket 32 slips in the mounting just detailed.

The safety factor is important, advantageous and necessary in the normal employment of mowing machines.

Blade 32 are inclined tranversely to have their trailing edges slightly higher than the cutting edges 33 thereof. Bracket 34 is so formed as to mount blades 32 in the manner just described and the slight angle of inclination is sufficient to create an up-draft that will draw the grass being cut to an upright position rather than whip it down to a place where cutting cannot occur. Note that the slight and gradual angle of inclination of blades 32 precludes the collection of any cut grass or other foreign material and the smooth upper and lower inclined edges of blades 32 are automatically cleaned as the blade assembly is rotated.

The operation of the vertical crank shaft engine mounting and blade assembly for mowing machines has been made clear during the course of the foregoing specification and while a portion of the invention has been described as most suitably adaptable for use in connection with mowing machines, it is obvious that the structure may be employed without confining the same to that type of equipment.

Having thus described the invention, what I claim as new and desire to secure by Letters Patent is:

1. In a vertical crank shaft engine mounting, a dual chamber crank case, one of the chambers being above the other; a plurality of ducts establishing the only means of communication between the chambers of the crank case, said crank shaft extending through the chambers; and blades on the crank shaft, within one of the ducts for forcing oil from the lower chamber upwardly through the duct housing the blades, the remaining ducts being formed and positioned to cause oil to flow by gravity from the upper chamber into the lower chamber, the duct having said blades therein being restricted at its zone of juncture with the upper chamber to create a jet of oil as it enters the upper chamber, said upper chamber having the connecting rod of the engine therein, the jet of oil intersecting the path of travel of a portion of the crank shaft and the connecting rod.

2. In a vertical crank shaft engine mounting, a dual chamber crank case, one of the chambers being above the other; a plurality of ducts establishing the only means of communication between the chambers of the crank case, said crank shaft extending through the chambers; and blades on the crank shaft, within one of the ducts for forcing oil from the lower chamber upwardly through the duct housing the blades, the remaining ducts being formed and positioned to cause oil to flow by gravity from the upper chamber into the lower chamber, the duct having said blades therein being restricted at its zone of juncture with the upper chamber to create a jet of oil as it enters the upper chamber, said upper chamber having the connecting rod of the engine therein, the connecting rod having a splash plate thereon, said jet of oil intersecting the path of travel of the splash plate.

LEONARD B. GOODALL.

REFERENCES CITED

The following references are of record in the file of this patent:

UNITED STATES PATENTS

| Number | Name | Date |
|---|---|---|
| 750,616 | Davis | Jan. 26, 1904 |
| 1,656,102 | Durkee | Jan. 10, 1928 |
| 1,844,386 | Harris | Feb. 9, 1932 |
| 2,192,762 | Vincze | Mar. 5, 1940 |
| 2,289,124 | Karey | July 7, 1942 |
| 2,302,472 | Power | Nov. 17, 1942 |

FOREIGN PATENTS

| Number | Country | Date |
|---|---|---|
| 339,618 | Australia | Dec. 10, 1930 |